United States Patent
Haynes, II et al.

(10) Patent No.: US 9,038,000 B2
(45) Date of Patent: May 19, 2015

(54) METHOD OF AND SYSTEM FOR BROWSING AND DISPLAYING ITEMS FROM A COLLECTION

(75) Inventors: Raymond Lee Haynes, II, Smithville, MO (US); Dave Nelson, New York, NY (US); Robb Smigielski, Kansas City, MO (US)

(73) Assignee: Copia Interactive, LLC, New York, NY (US)

( * ) Notice: Subject to any disclaimer, the term of this patent is extended or adjusted under 35 U.S.C. 154(b) by 799 days.

(21) Appl. No.: 12/894,090

(22) Filed: Sep. 29, 2010

(65) Prior Publication Data

US 2012/0036482 A1    Feb. 9, 2012

Related U.S. Application Data

(60) Provisional application No. 61/370,771, filed on Aug. 4, 2010, provisional application No. 61/374,518, filed on Aug. 17, 2010, provisional application No. 61/375,225, filed on Aug. 19, 2010.

(51) Int. Cl.
*G06F 17/24* (2006.01)
*G06Q 30/02* (2012.01)

(52) U.S. Cl.
CPC .......... *G06F 17/241* (2013.01); *G06Q 30/0201* (2013.01)

(58) Field of Classification Search
CPC ................ G06F 17/30867; G06F 17/30997; G06F 3/04842; G06F 17/30716; G06F 17/218; G06F 17/241; G06F 17/30017; G06F 17/30061; G06F 17/30058; G06Q 30/201

USPC ......... 715/776–777, 789, 805, 810–811, 825, 715/835, 838–839, 854, 962
See application file for complete search history.

(56) References Cited

U.S. PATENT DOCUMENTS

| | | | | |
|---|---|---|---|---|
| 5,689,669 | A | * | 11/1997 | Lynch et al. ................... 715/848 |
| 6,029,172 | A | * | 2/2000 | Jorna et al. ............................ 1/1 |
| 6,031,537 | A | * | 2/2000 | Hugh ............................. 715/854 |

(Continued)

OTHER PUBLICATIONS

Steimle et al., "CoScribe: Intergrating Paper and Digital Documents for Collaborative Knowledge Work", IEEE Transactions on Learning Technologies, vol. 2, No. 3, Jul.-Sep. 2009, copyright IEEE 2009.*

(Continued)

*Primary Examiner* — Andrew Tank
(74) *Attorney, Agent, or Firm* — Westberg Law Offices

(57) ABSTRACT

In accordance with an embodiment, a method of browsing and displaying items from a collection is provided. Information about each of plurality of items in a collection is stored. A plurality of user-entered tags is obtained. Each tag comprises a term associated with one or more of the items in the collection. The tags are stored in machine-readable storage media. An image that is representative of an item is displayed on a display screen along with images that are representative of each of a plurality of associated tags. In response to a user selecting a particular one of the displayed tags, an image representing the selected tag is displayed along with a plurality of images that are representative of items associated with the selected tag. In response to the user selecting a particular one of the displayed items, an image that is representative of the selected item can be displayed along with a plurality of images that are representative of tags associated with the selected item.

22 Claims, 6 Drawing Sheets

(56) References Cited

U.S. PATENT DOCUMENTS

| | | | |
|---|---|---|---|
| 6,973,628 B2 * | 12/2005 | Asami | 715/838 |
| 7,308,643 B1 * | 12/2007 | Zhu et al. | 715/206 |
| 7,366,721 B1 * | 4/2008 | Bennett et al. | 711/206 |
| 7,409,644 B2 * | 8/2008 | Moore et al. | 715/774 |
| 7,792,868 B2 * | 9/2010 | Finkelstein et al. | 707/798 |
| 7,941,429 B2 * | 5/2011 | Krovitz et al. | 707/723 |
| 8,060,489 B1 * | 11/2011 | Raman et al. | 707/706 |
| 8,224,851 B2 * | 7/2012 | Banda et al. | 707/781 |
| 8,266,542 B2 * | 9/2012 | Sayers et al. | 715/781 |
| 8,560,398 B1 * | 10/2013 | Gregov et al. | 705/26.2 |
| 8,660,912 B1 * | 2/2014 | Dandekar | 705/27.1 |
| 2004/0054627 A1 | 3/2004 | Rutledge | |
| 2005/0154761 A1 | 7/2005 | Lee et al. | |
| 2005/0234896 A1 * | 10/2005 | Shima et al. | 707/3 |
| 2006/0026635 A1 | 2/2006 | Potrebic et al. | |
| 2006/0242121 A1 * | 10/2006 | DeVorchik et al. | 707/3 |
| 2007/0033220 A1 | 2/2007 | Drucker et al. | |
| 2008/0062141 A1 * | 3/2008 | Chandhri | 345/173 |
| 2008/0086688 A1 | 4/2008 | Chandratillake et al. | |
| 2009/0007018 A1 | 1/2009 | Ikeda et al. | |
| 2009/0164946 A1 * | 6/2009 | Liddington | 715/853 |
| 2009/0199098 A1 * | 8/2009 | Kweon et al. | 715/716 |
| 2010/0057555 A1 * | 3/2010 | Butterfield et al. | 705/14.41 |
| 2010/0131899 A1 * | 5/2010 | Hubert | 715/823 |
| 2012/0124478 A1 * | 5/2012 | King et al. | 715/738 |

OTHER PUBLICATIONS

International Search Report, for International Application No. PCT/US2010/50764, dated Nov. 15, 2010.
Written Opinion of the International Searching Authority, for International Application No. PCT/US2010/50764, dated Nov. 15, 2010.

* cited by examiner

FIG. 2

METHOD OF AND SYSTEM FOR BROWSING AND DISPLAYING ITEMS FROM A COLLECTION

This application claims the benefit of U.S. Provisional Application No. 61/370,771, filed Aug. 4, 2010, U.S. Provisional Application No. 61/374,518, filed Aug. 17, 2010, and U.S. Provisional Application No. 61/375,225, filed Aug. 19, 2010. The entire contents of each of these provisional applications are hereby incorporated by reference.

BACKGROUND OF THE INVENTION

The present invention relates to browsing and displaying items from a collection.

Items in a collection are typically arranged by subject matter or alphabetically. For example, a collection of books in a bookstore may be arranged in groups by subject matter. Then, within each subject-matter group, the books may be sorted alphabetically by author. This arrangement has a drawback in that it makes browsing the entire collection of books difficult unless a person already knows what he or she is looking for.

Websites that offer items for sale often employ computer-implemented search facilities that allow a person to perform a search of a collection, such as by using a search term selected by the user. For example, the person can search for products having a particular keyword associated with the product. Or, in the case of music and books, a person can search for a particular artist, author or genre. However, the display of information tends to be somewhat monotonous, with e-commerce websites displaying their products in a similar manner.

Therefore, what is a needed is are improved techniques for allowing persons to browse items in a collection and for the display of the items from the collection.

SUMMARY OF THE INVENTION

The present invention provides methods of and apparatus for browsing and displaying items from a collection. In accordance with an embodiment, a method of browsing and displaying items from a collection is provided. Information about each of plurality of items in a collection is stored. A plurality of user-entered tags is obtained. Each tag comprises a term associated with one or more of the items in the collection. The tags are stored in machine-readable storage media. An image that is representative of an item is displayed on a display screen along with images that are representative of each of a plurality of associated tags. In response to a user selecting a particular one of the displayed tags, an image representing the selected tag is displayed along with a plurality of images that are representative of items associated with the selected tag. In response to the user selecting a particular one of the displayed items, an image that is representative of the selected item can be displayed along with a plurality of images that are representative of tags associated with the selected item.

BRIEF DESCRIPTION OF THE DRAWINGS

The present invention is described with respect to particular exemplary embodiments thereof and reference is accordingly made to the drawings in which:

FIG. 2 illustrates a display screen for browsing and display of items from a collection in accordance with an embodiment of the present invention;

DETAILED DESCRIPTION OF A PREFERRED EMBODIMENT OF THE INVENTION

The present invention provides methods of and apparatus for browsing and display of items from a collection. More particularly, the present invention provides new, visually creative and attention-grabbing ways of browsing and display of such items. In a preferred embodiment, the user can not only browse items by traditional criteria, such as genre and name of the author or artist, but also by using innovative criteria and display techniques that use community and social information to identify items that are likely to be of interest, and that are related to each other, in untraditional ways.

The present invention is particularly suited for e-commerce websites that offer a variety of products. Such products can include digital content that can be downloaded and/or viewed via the website. Examples of such digital content include text, video, images, audio and combinations thereof. These can be in the form of electronic books (also referred to as e-books), music downloads, video downloads (e.g., movies and television shows), and multimedia presentations that include both text and images, such as digital magazines. Such products can also include products that are ordered via the website and then physically transported to the purchaser. Examples include paperback and hardbound books, music CDs and video DVDs.

Figure 1:
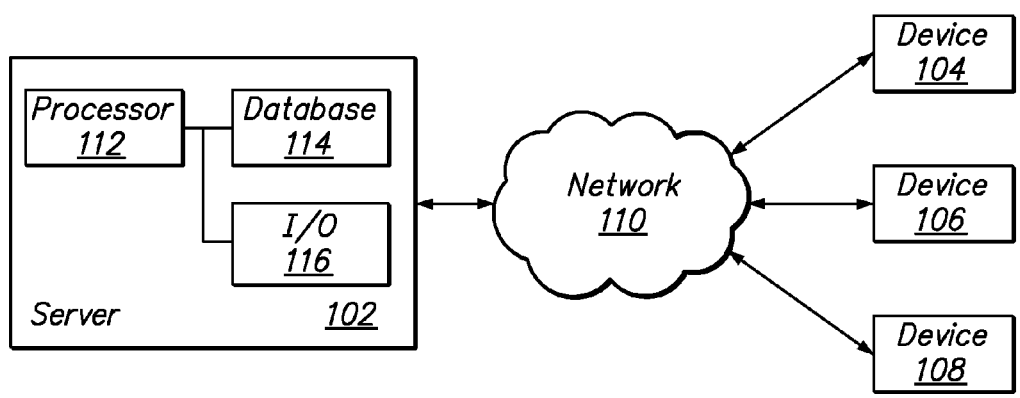
FIG. 1 illustrates a system that may be used to browse and display items from a collection in accordance with an embodiment of the present invention.

In an exemplary embodiment, the present invention can be implemented in the context of an electronic commerce system in which consumers browse and view products and possibly also purchase and/or electronically download the products. FIG. 1 illustrates a system 100 that may be used to browse and display items from a collection in accordance with an embodiment of the present invention. As shown in FIG. 1, a server 102 is communicatively coupled to a plurality of remote devices 104, 106, and 108 via a network 110. The a server 102 includes a processor 112, a database 114 and input/output devices 116, which may include a display, a keyboard, a mouse, and a network interface. The network 110 may include, for example, a local area network, an intranet, and/or a wide area network, such as the Internet. The remote devices 104, 106, 108, may be implemented as various computing devices, such a desktop or portable personal computer, a "smart" phone, e-book reader device, a PDA or other device. A user accesses the server 102 by using a remote device 104, 106 or 108. For example, the server 102 may host website portal which can be accessed by users of the devices 104, 106 or 108. The remote devices 104, 106, 108 may communicate with the server 102 and with each other by wireless or wired connections. While a single server 102 is shown, it will be understood that the functions of the server 102 may be performed by multiple servers or by a distributed server system.

In an embodiment, the products include digital content, such as a documents, which may include text, video, images, audio and combinations thereof. For example, a document may include both text and images. The documents can be electronic books (also referred to as e-books). Users may access the products by downloading and/or viewing the products, and can perform other actions described herein, via a website which may be hosted by the server 102. The products can include other types of products, such as paperback and hardbound books. In this case, the products may be ordered via the website.

In an embodiment, the digital content, such as e-books, and information about the digital content, such as a summary of each book and an image that is representative of the book, are initially stored at the server 102. Users can access the content by downloading individual files, such as an e-book file, to a remote device 104, 106 or 108 and/or by viewing the content using a remote device 104, 106 or 108. The users can perform other actions described herein, via communication the server 102 and/or with other remote devices 104, 106 or 108. For example, users can join a user community, e.g., by logging into the website using a user name and password.

Figure 2:
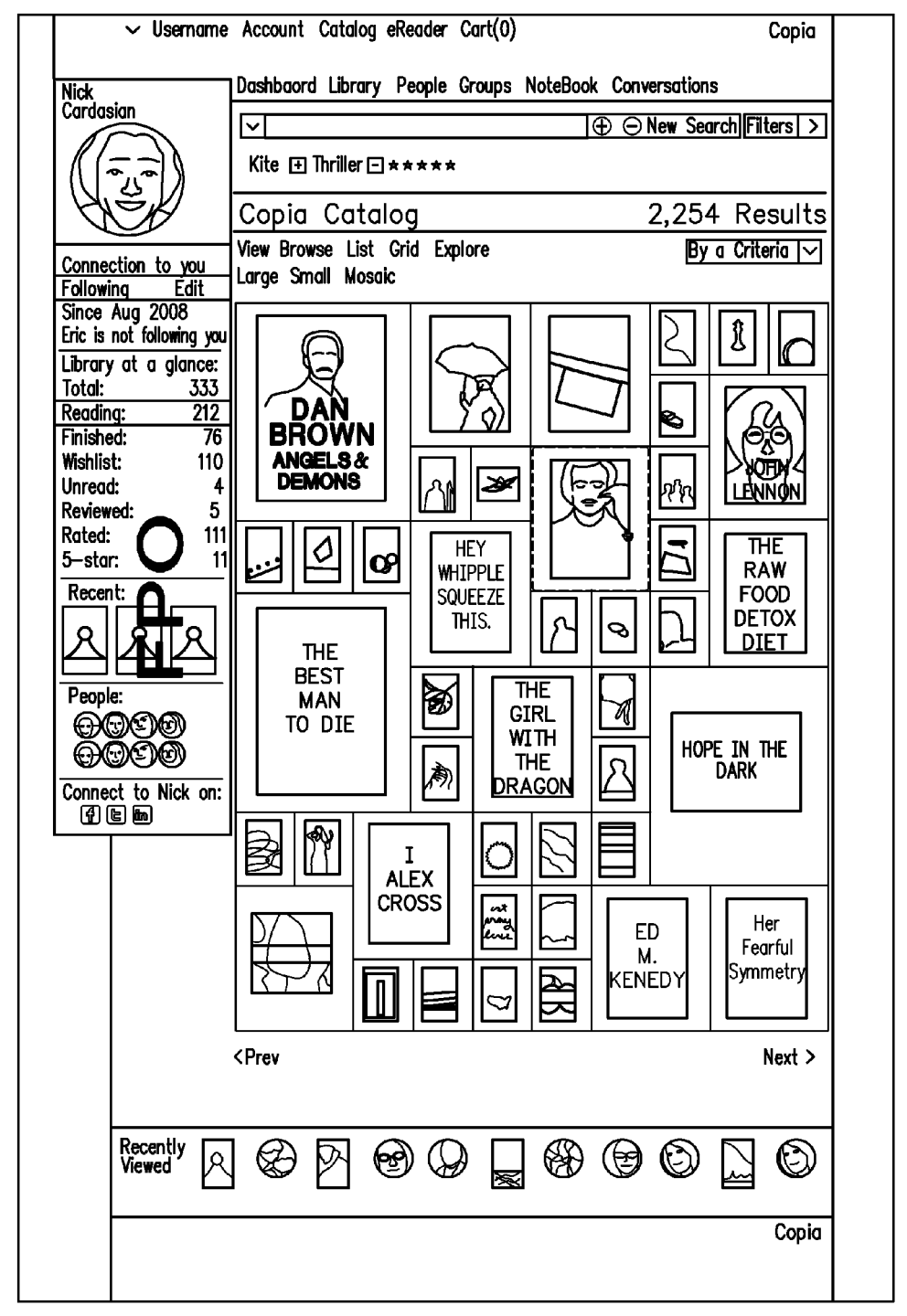

FIG. 2 illustrates a display screen for browsing and display of items from a collection in accordance with an embodiment of the present invention. This display arrangement may be generated at the server 102 and communicated to a user's device 104, 106 or 108 via the network 110. Thus, this display arrangement of items can be displayed on the user's device 104, 106 or 108 by the user accessing the website portal.

As shown in FIG. 2, a selected group of items from a collection are displayed graphically. In this example, the items are books or e-books. The items are displayed graphically by an image of each item that represents the item. In the case of e-books, the images can include book covers that typically show at least the book title and possibly also the name of the author and cover artwork. Such a group of items is displayed in response to a user selection. In other embodiments, the images displayed can be album covers, movie posters, magazine covers and so forth.

The collection of items may be sorted according to one or more sorting criteria that are selected by the user or according to one or more default criteria. For example, the criteria may be one or more of: alphabetical by title, reverse alphabetical by title, by subject, alphabetical by author, reverse alphabetical by author, by date (e.g., date added to the collection or date of publication), length, relevance to a particular topic selected by the user, best-sellers, user ratings, editor's picks, genre, and so forth. For using relevance to a particular topic selected by the user, the user may enter one or more search terms. As an example, if the user searched the collection using the term "Stephen King," the results could include books by him, other books being about him, books he co-wrote, or books mentioning his name, with the books written by him likely being considered most relevant.

As another example of sorting criteria, "tags" may be used for sorting the items. Tags are discussed in more detail herein. Thus, for example, items may be sorted according to the number times different users have entered or otherwise associated a term or tag with each of the items.

As still another example, the user may select "Community Value" for sorting the items. U.S. Provisional Patent Application No. 61/370,771, filed Aug. 4, 2010, and entitled "System for and Method of Determining Relative Value of a Product," is hereby incorporated by reference and discusses such a Community Value that can be assigned to the items. The community value for an item is essentially a value determined by combining a value representative of purchasing activity directed toward the item and a value representative of non-purchasing, social activity that is directed toward the item.

The user may preferably select two or multiple sorting criteria, in which case, the sorting criteria are applied simultaneously. For example, the user may select only best-sellers in a particular subject-matter category.

As a result of the sorting, the items are arranged in a particular order. A group of the items may then be selected for display according to the order. For example, if the items are sorted alphabetically by author, a group from the beginning of the alphabet can be selected for display. As another example, if the items are sorted according to user ratings, the a number of titles that have the highest average user ratings can be selected for display. The group can include a predetermined number of items.

In an embodiment, the group of items that are selected for display are displayed in a plurality of different image sizes. As shown in FIG. 2, the book covers, or other image that represents the item, are shown in three different sizes: small, medium and large. It will be apparent, however, that a different number of sizes can be selected. The size of the image for an item can correspond to the rank of the item according to sorting criteria. Items that fit the criteria best can be ranked highest and, thus, have the largest images. As an example, where the sorting criteria includes user ratings, the highest rated items can be displayed with larger image sizes, whereas, lower rated items can be displayed with smaller image sizes. As another example, where sorting criteria includes relevance, the most relevant items can be displayed with larger image sizes. Also, where multiple sorting criteria are employed, different criteria can be used to select the items for display than is used to assign image size. For example, the items can be selected for display alphabetically according to the author's name, while the size assigned to the corresponding image can be according to average user ratings.

The placement of the images on the display is preferably performed at least partially at random. Thus, the particular position on the display screen that is occupied by a particular one of the items selected for display can be selected randomly. In an embodiment, items having the highest rank (and thus the largest images) can be assigned positions before items having lower rank (and thus smaller images). Once an item is assigned a position, its occupied display area is no longer available for later-assigned items. Thus, an item having the highest rank (and largest image size) may be randomly assigned a position first. Then, a next item having the next highest rank (and also possibly having the largest image size) may be randomly assigned a position among positions that are not already occupied by the first item. Then, once the items having largest image sizes are assigned, items having a next largest image size may be assigned, filling in unoccupied areas in the display. This process may be continued until all items selected for display have been assigned a position in the display or until all positions have been filled. Preferably, display of all of the items in the group completely fills the available display area.

So that the display area can be entirely occupied, an entire available rectangular display area can be divided into a number of smaller rectangles with the smallest image size corresponding to a single rectangle. For example, such a display area can be divided into a ten by ten grid of 100 smaller rectangles. After all of the large and medium image sizes are assigned, all of the remaining unoccupied spaces can be occupied by the smallest image sizes. Therefore, once all of the items to be displayed are assigned positions, there are preferably no unoccupied spaces or rectangles.

In an embodiment, the areas of the small, medium and large image sizes have the following relationship: 1 to 4 to 9. In other words, the smallest image size occupies one rectangle; the medium image size occupies four rectangles (i.e. an area that is two rectangles by two rectangles); and the large image size occupies nine rectangles (i.e. an area that is three rectangles by three rectangles). In this embodiment, the relationship is a series of square numbers $(1, 4, 9, 16, 25 \ldots n^2)$. It will be apparent, however, that a different number of sizes may be selected and that a different relationship among the sizes may be selected. It will be apparent that image shapes other than, or in addition to, rectangles can be utilized, such as circles, ovals, triangles, hexagons, and so forth.

Because there is a random aspect to the display arrangement, different instances of displaying the same group of items can result in a different arrangement. For example, if the user selects to re-load the display, the same group of items may be selected but displayed in a different arrangement.

In an embodiment, the selection of items for display may also have a random aspect. For example, instead of or in addition to applying a user-selected sorting criteria, a group of items may be randomly selected for display or at least partly randomly selected for display. The items may be arranged at least partly randomly as described above. The image sizes may also be random or they may reflect a sorting criteria, such as average user ratings. As an example, a user may select sorting alphabetically by author. Then, a random group of items can be selected among those whose author's last name begins with the letter "A" and with the highest rated items being displayed with larger images.

Additionally, the user preferably can browse through additional groups of items. As shown in FIG. 2, this may be accomplished by the user by clicking on "forward" and "back" arrows located beneath a displayed group of items. This may select different groups of items for display according to the selected sorting criteria. For example, if items are sorted alphabetically and the first 64 items in the sorted list are displayed, then clicking the forward arrow may cause a next group of 64 items to be selected starting with the $65^{th}$ item in the sorted list.

The arrangement of items as displayed on the user's device 104, 106 or 108 can show the cover images of books (or other images that represent the items) in a seemingly random way across and down the display page and with different sized images. The overall appearance is of a mosaic of different sized images. While this view is preferably not completely random, since it can be based on sort criteria, it will appear so and each time the user loads the page the would get a different ordering of the images.

The embodiment described above can be used in connection with portable devices 104, 106 or 108 having a display screen of limited size. For devices 104, 106 or 108 having a larger display screen, such as a desktop computer, a greater number of items can be displayed and with a greater number of sizes. For example, there can be four different image sizes that can have the following relationship: 1 to 4 to 16 to 64. Thus, the largest image size may occupy an area of eight by eight rectangles, with the other image sizes occupying areas that are four-by-four, two-by-two and one-by-one. In this embodiment, the relationship is $4^n$ where n is an integer series $(1, 2, 3, \ldots n)$, with the following result: $1, 4, 4^2, 4^4 \ldots 4^n$. It will be apparent, however, that a different number of sizes may be selected and that a different relationship among the sizes may be selected.

Figure 3:
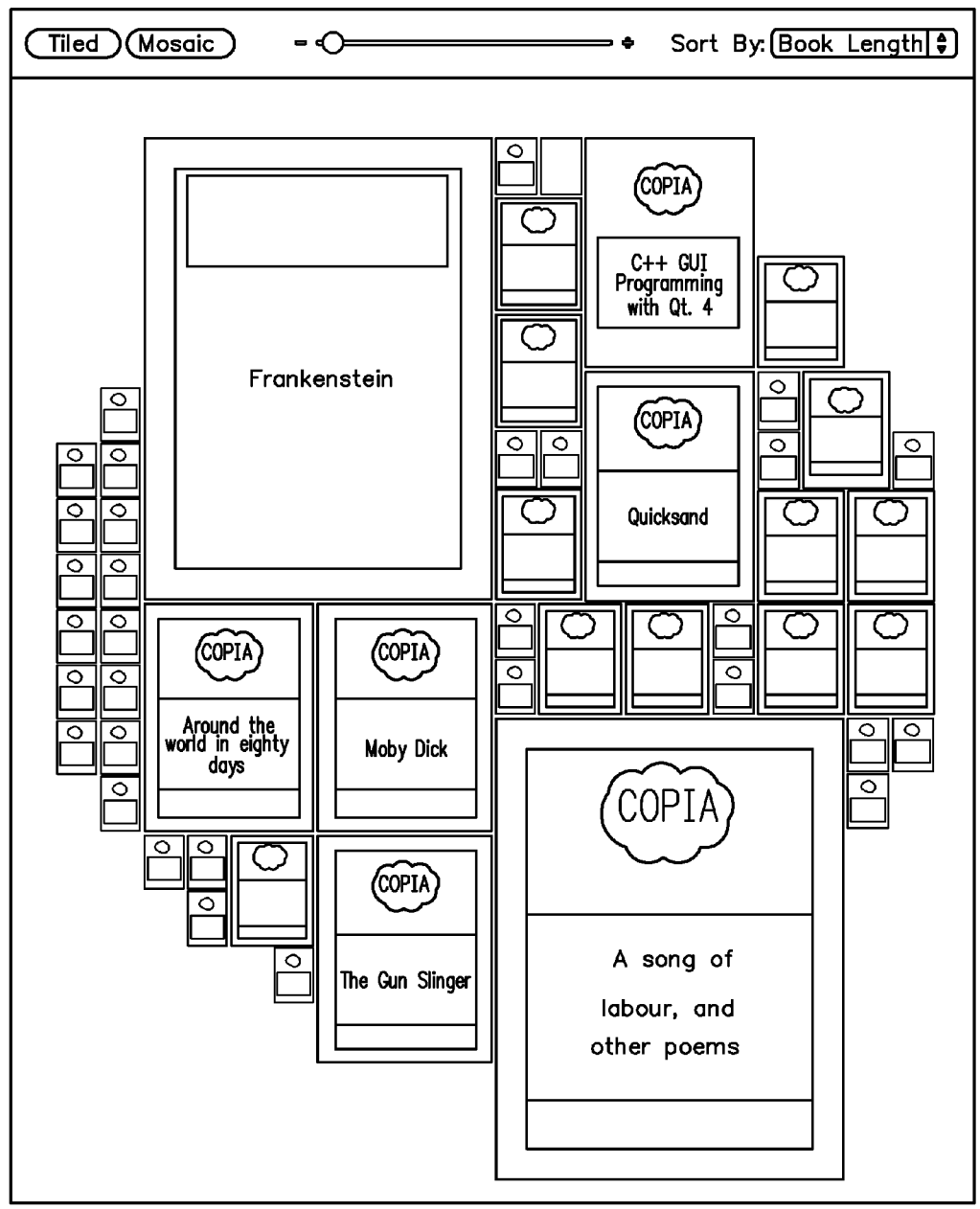
FIG. 3 illustrates a second display screen for browsing and display of items from a collection in accordance with an embodiment of the present invention.

Additionally, rather than placing the items in a rectangular grid, the images may be placed in circular or spiral fashion starting from a point near the center of the screen. FIG. 3 illustrates a second display screen for browsing and display of items from a collection in accordance with an embodiment of the present invention. As shown in FIG. 3, different size images are distributed around the display area. Preferably, there are no gaps between items, however, outer portions of the display area are not completely filled. As before, the different sizes can be assigned to items according to each item's rank according to the sorting criteria. Thus, the center point appears as a center of gravity with results flowing out from it rather than down and across the screen as in FIG. 2. Also, the user can preferably browse additional items, for example, by clicking forward and back buttons on the screen. The number of items displayed can be randomly selected within certain constraints, such as being within a preselected minimum and maximum number.

In accordance with a further embodiment of the present invention, each of a plurality of items in a collection is associated with one or more terms or phrases (these terms and phrases are referred to herein as "tags"). The tags can represent categories or provide other information out the item. For example, the tags for a book or e-book can identify its author, genre, themes of the book, key words related to its content or any other information or topics related to the book. Specific examples of tags may include: "New York Times Bestseller," "mystery," "romance," "J. D. Salinger," "phonies," "banned," "modern," "fiction," "nature," "poignant," "classic," "boring," etc.

In a preferred embodiment, the tags include user-generated tags. For example, a user may access the web portal using a device 104, 106, or 108, and may select any of the items in a collection. The user can then enter one or more tags selected by the user. The tags are then stored at the server 102 in a manner that maintains an association between the item and each associated tag. For example, a number of tags may be stored for each item. Additionally, where the same tag is entered for the same item by two more different users, this tag is preferably stored along with the number of times that different users that entered or otherwise associated the same tag with the item.

Additionally, the same tag may be associated with multiple different items. Therefore, the stored information also maintains an association between each tag and the associated items that share that same tag.

The tags may be obtained from sources other than users. For example, an operator of the web portal may determine the tags assigned to each item. As another example, the tags may be obtained from published literary reviews of the items (e.g. as keywords contained in the reviews). As yet another example, the tags for a book may automatically include the name of the author and possibly other information.

Figure 4:
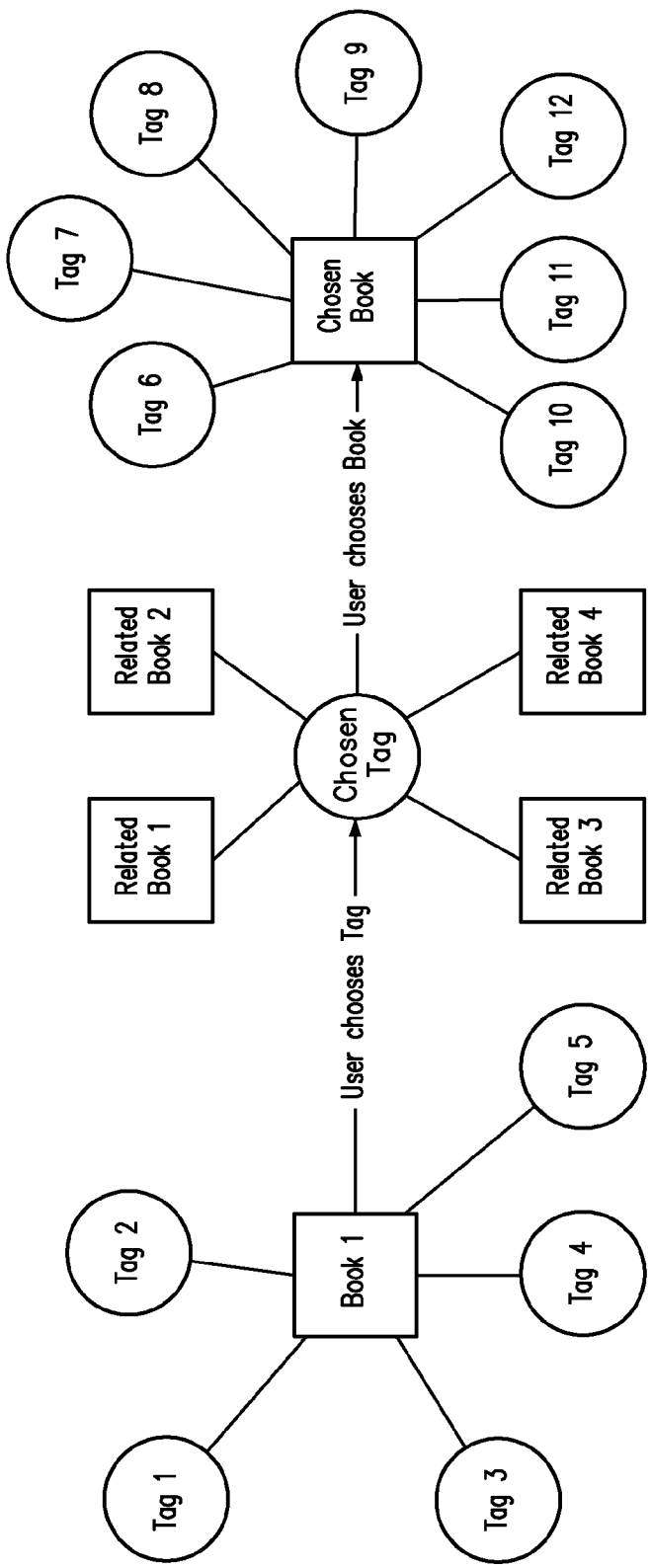
FIG. 4 illustrates a structure of relationships among items from a collection in accordance with an embodiment of the present invention.

FIG. 4 illustrates a structure for relationships among items from a collection in accordance with an embodiment of the present invention. The items shown in FIG. 4 are books, though the items could be another type of item. Referring to FIG. 4, a particular book, identified in the figure as "Book 1," is associated a number of tags, identified as "Tag 1," "Tag 2," "Tag 3," "Tag 4," and "Tag 5."

Figure 5:
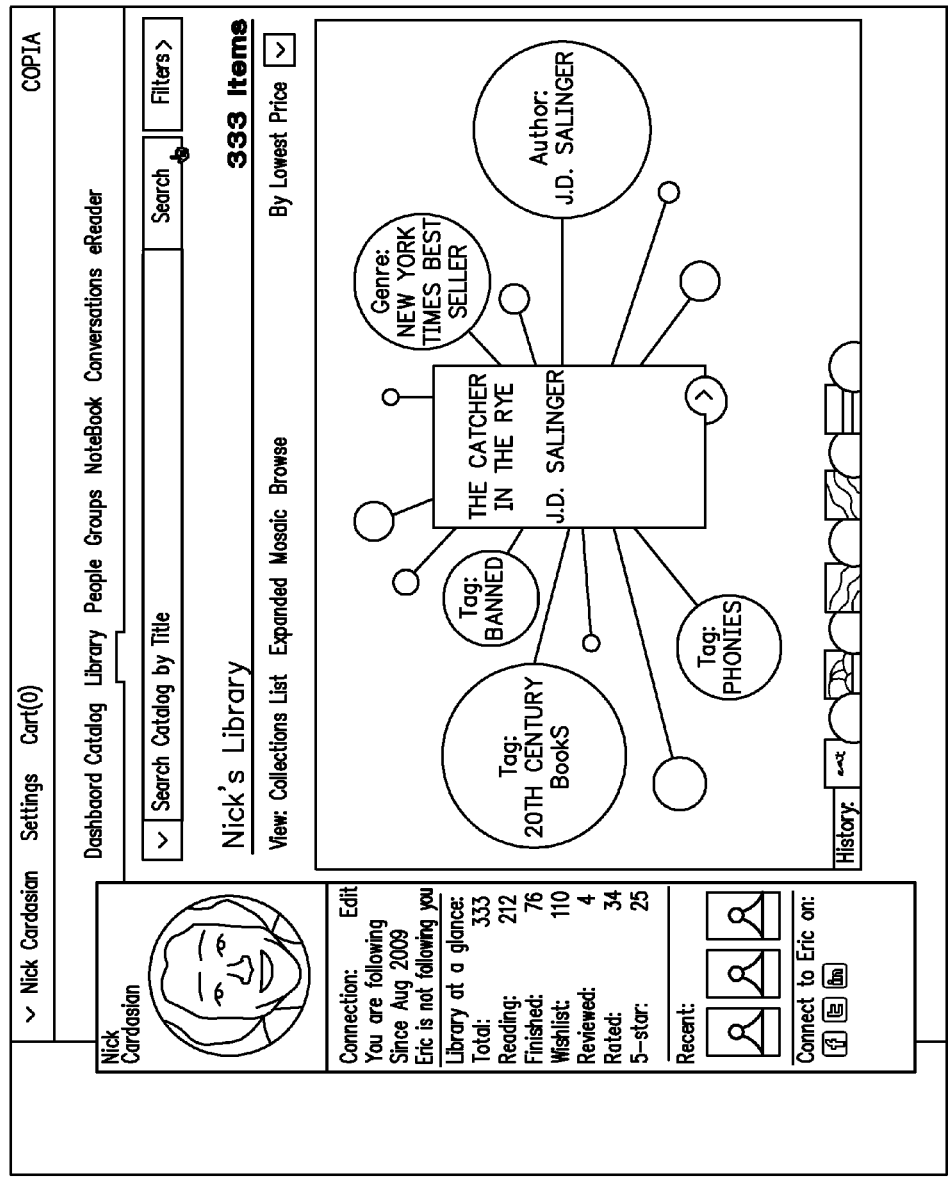
FIG. 5 illustrates a third display screen for browsing and display of items from a collection in accordance with an embodiment of the present invention.

The item and its associated tags may be displayed graphically for the user. FIG. 5 shows a display screen for browsing and display of items from a collection using tags in accordance with an embodiment of the present invention. Referring to FIG. 5, the selected item is a book, in this case, J. D. Salinger's "The Catcher in the Rye." The associated tags are shown as graphic elements (e.g. bubbles or circles). The associations between the item and the tags are shown as lines connecting the tags to the item. In a preferred embodiment, the graphic elements that represent the tags have a characteristic that represents the relevancy of the tag to the item. The relevancy can be represented by the number of times that different users have associated that tag with the item. And, as shown in FIG. 5, the characteristic that represents relevancy is the size of the graphic elements (i.e. the bubbles). Thus, in FIG. 5, a larger bubble represents a greater number of users having tagged the item with that tag.

Figure 6:
FIG. 6 illustrates a fourth display screen for browsing and display of items from a collection in accordance with an embodiment of the present invention.

As explained above, each item in the collection can have a number of tags associated with it. Additionally, the same tag may be associated with multiple different items. The user can browse the collection of items by clicking or otherwise selecting a particular tag for the displayed item. This action will then cause other items that are associated with the selected tag to be the displayed. FIG. 6 illustrates another display screen for browsing and display of items from a collection using tags in accordance with an embodiment of the present invention. Referring to FIG. 6, a particular tag, in this case, "MODERN" is shown along with several items that all share this term MODERN as a tag. The user may then click on or otherwise select one of the items shown that are associated with this tag. This action will then cause the item to be displayed along with tags that are associated with the selected item (as in FIG. 5).

In this manner, a user can browse the collection of items by alternately clicking items and tags. FIG. 4 illustrates this graphically. Assuming an item is displayed (e.g., Book 1 of FIG. 4), the user can select a tag associated with the item (e.g. "Chosen Tag" in FIG. 4). This causes the chosen tag to be displayed along with several items that have that same tag (these are "Related Book 1," "Related Book 2," "Related Book 3," and Related Book 4" in FIG. 4). The user can then click on one of these items (e.g., "Chosen Book" in FIG. 4). This causes the chosen item to be displayed along with tags that are associated with that item ("Tag 6," "Tag 7," "Tag 8," "Tag 9," "Tag 10," "Tag 11," and "Tag 12").

Referring to FIG. 6, in a preferred embodiment, the graphic elements that represent the items also have a characteristic that represents relevancy of the item. For example, the relevancy can be represented by the number of times that different users have associated that tag with the item. As shown in FIG. 6, the characteristic is the size of the image of the book's cover. Thus, in FIG. 6, a larger image represents a greater number of users having tagged the item.

As shown in FIGS. 5 and 6, the images representing items include book covers. In other embodiments, the images displayed can be album covers, movie posters, magazine covers and so forth.

When an item is displayed, rather than clicking on an associated tag, the user may select to receive details regarding the item. For example, the user may "right click" on the image of the item. This would then display detailed information about that item and possibly also information about purchasing the item along with an ability to purchase the item. Also, in an embodiment, a browsing history may appear, e.g. along the bottom of the display. As shown in FIGS. 5 and 6 a browsing history appears along the bottom of the display as a alternating series of images representing tags and items. By clicking on one of these, the user is brought back to a previous point in their browsing history.

In an embodiment, a preselected number of tags are displayed for each item (as in FIG. 5). Additionally, a preselected number of items are displayed for each tag (as in FIG. 6). For example, the preselected number can be twelve in both cases. However, it will be apparent that a different number could be displayed.

If the selected item is associated with fewer than twelve tags or if the selected tag is associated with fewer than twelve items, then a different number can be displayed. Also, in place of the items or tags, different information can be displayed. For example, a link to another user's profile can be used in place of each tag or item. Preferably, this user profile is randomly-selected from among those users who have the displayed item in his or her own library or who have tagged an item with the displayed tag.

If an item selected for display (as in FIG. 5) has more than the preselected number of associated tags, then the particular tags that are displayed (as in FIG. 5) can be selected from among these associated tags. Preferably, the selected tags include ones that are highly relevant to the item (and thus have large bubbles) as well as ones that are less relevant to the item (and thus have smaller bubbles). In an embodiment, the tags selected for display can be selected at least partially at random.

Similarly, if a tag selected for display (as in FIG. 6) has more than the preselected number of associated items, then the particular items that are displayed can be selected from among these associated items. Preferably, the selected items include ones that are highly relevant to the tag (and thus have large images) as well as ones that are less relevant to the tag (and thus have smaller images). In an embodiment, the items selected for display can be selected at least partially at random.

This browsing and display process is preferably started by random selection of an item from the user's own library. The user's library can consist of items that the user purchased or otherwise selected to be included in his or her library. If the user does not have any items in a library, then the process is preferably started by random selection of a "friend" of the user and then by randomly selecting an item in the friend's library. A friend can be another user where the two users have indicated that they are friends. An initial item or tag may be selected by other means. For example, a tag may be selected at random so that the process is started by display of the randomly selected tag and items associated with it. Or, the user may be prompted to enter a tag or to select a tag from a list of tags.

Therefore, in accordance with an embodiment, a book is obtained from the user's library (and if the user has no books in his or her library one is obtained from a friend) and then "things" (i.e. tags) that are related to the book are displayed. These things could be the author, the genre, common tags for the book or even other users who have included the book in their library. This then allows the user to explore the catalog by clicking through displayed items and tags. For example if the book was "The DaVinci Code," related tags might be "Dan Brown," "thrillers," "European cities," "religion," "art history," etc. The user may then click any of these related tags and be taken to a new result set based on what was chosen. If the user chooses "Dan Brown" then that will be displayed as the center tag and the author's other books will be displayed as related items. This step can be repeated over and over allowing the user to browse deeper and deeper into the collection. The system ideally will utilize tag data (tags provided by publishers and from the user community) to tie together products in new and unexpected ways. For example, a user may be browsing "European travel" and come across "The DaVinci Code" because many users have tagged it with "Paris," "The Louvre," etc. Because individual users can tag items, social/community data is used to selectively display results the user may never have achieved on his or her own by performing simple searches on a book title or author.

Because tags are preferably user-entered, there can be a potentially unlimited number of tags. In some cases, the user-entered tags can be of the same term, but spelled or otherwise represented differently. For example, some users may type "20th Century," whereas, other users may type "Twentieth Century." Different representations of terms mean the same thing are preferably associated with each other and treated equivalently.

The description above illustrates operation of embodiments of the invention and is not meant to limit the scope of the invention. It will be apparent to one skilled in the relevant art that variations will be encompassed by the spirit and scope of the invention and that the invention may be practiced in other embodiments. The particular division of functionality between the various system components described herein is merely exemplary. Thus, the methods and operations presented herein are not inherently related to any particular computer or other apparatus. Functions performed by a single system component may instead be performed by multiple components, and functions performed by multiple components may instead performed by a single component. It will also be apparent that process steps described herein can be embodied in software, firmware or hardware. Thus, the present invention or portions thereof may be implemented by apparatus for performing the operations herein. This apparatus may be specially constructed or configured, such as application specific integrated circuits (ASICs) or Field Programmable Gate Arrays (FPGAs), as a part of an ASIC, as a part of FPGA, or it may comprise a general-purpose computer selectively activated or reconfigured by a computer program stored on a computer readable medium that can be accessed and executed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and or coupled to a computer system bus. Furthermore, the methods described in the specification may be implemented by a single processor or be implemented in architectures employing multiple processor designs for increased computing capability. Accordingly, the disclosure of the present invention is intended to be illustrative, but not limiting, of the scope of the invention.

What is claimed is:

1. A method of browsing and displaying media items from a media collection comprising steps of:
   storing information about each of a plurality of media items in a media collection;
   obtaining a plurality of tags, the tags being terms or phrases associated with one or more of the media items in the media collection;
   storing the tags in machine-readable storage media;
   displaying an item image that is representative of a media item on a display screen along with tag images comprising the terms or phrases of each of a plurality of tags associated with the media item;
   in response to a user selecting a particular one of the displayed tag images, displaying the selected tag image along with a plurality of item images that are representative of media items associated with the selected tag, the item images each having a size that represents a respective relevancy of the media item to the selected tag; and
   in response to the user selecting a particular one of the displayed item images after said selecting a particular one of the displayed tag images, displaying the selected item image along with a plurality of tag images comprising terms or phrases of tags associated with the selected media item.

2. The method according to claim 1, wherein each media item is associated with a plurality of tags and each tag is associated with one or more of the media items.

3. The method according to claim 1, further comprising obtaining tags from sources other than users.

4. The method according to claim 1, wherein the media items comprise books and electronic books and wherein the item images that are representative of the media items comprise images of book covers.

5. The method according to claim 1, wherein the tag images of each of the tags have a characteristic that represents relevancy of the tag to the media item.

6. The method according to claim 5, wherein the characteristic is a size of the tag images.

7. The method according to claim 5, wherein the relevancy of the tag to the media item is determined from the number of times that users have associated the tag with the media item.

8. The method according to claim 1, wherein the relevancy of the media item to the selected tag is determined from the number of times that users have associated the tag with the item.

9. The method according to claim 1, wherein said displaying the item image on the display screen along with the plurality of tag images associated with the displayed item image comprises displaying lines connecting the item image to each of the associated tag images.

10. The method according to claim 9, wherein said displaying the selected tag image along with the plurality of item images associated with the selected tag comprises displaying lines connecting the selected tag image to each of the associated item images.

11. The method according to claim 1, wherein said displaying the item image that is representative of the media item on the display screen along with tag images comprises selecting a subset of tags from a group of tags that are associated with the item.

12. The method according to claim 11, wherein the tags in the subset are selected according to relevancy to the item.

13. The method according to claim 11, wherein the tags in the subset are selected at least partially at random.

14. The method according to claim 1, wherein said displaying the selected tag image with the plurality of item images associated with the selected tag comprises selecting a subset of media items from a group of media items that are associated with the selected tag.

15. The method according to claim 14, wherein the media items in the subset are selected according to relevancy to the selected tag.

16. The method according to claim 14, wherein the media items in the subset are selected at least partially at random.

17. The method according to claim 1, wherein the tags comprise user-entered terms.

18. The method according to claim 1, wherein said displaying the item image on the display screen along with the plurality of tag images associated with the displayed item image comprises displaying the item image in a central area of a display area of the display screen and displaying the associated tag images around the central area.

19. The method according to claim 18, wherein after said selecting a particular one of the displayed tag images, the selected tag image is displayed in the central area and the item images associated with the selected tag are displayed around the central area.

20. The method according to claim 19, wherein said displaying the item image on the display screen along with the plurality of tag images associated with the displayed item image comprises displaying lines connecting the item image to each of the associated tag images and wherein displaying the selected tag image along with the plurality of item images associated with the selected tag comprises displaying lines connecting the selected tag image to each of the associated item images.

21. A system for browsing and displaying media items from a media collection comprising:
  a plurality of remote devices under control of users; and
  one or more servers in communication with the plurality of remote devices wherein the one or more servers store information about each of plurality of media items in a media collection and wherein the one or more servers store a plurality of tags, the tags being terms or phrases associated with one or more of the media items in the media collection, and wherein the one or more servers cause an item image that is representative of a media item to be displayed on a display screen of a particular one of the remote devices along with tag images comprising the terms or phrases of each of a plurality tags associated with the media item, wherein in response to a user selecting a particular one of the displayed tag images, the one or more servers cause the selected tag image to be displayed on the display screen along with a plurality of item images that are representative of media items associated with the selected tag, the item images each having a size that represents a respective relevancy of the media item to the selected tag, and, wherein in response to the user selecting a particular one of the displayed item images after said selecting a particular one of the displayed tag images, displaying the selected item along with a plurality of tag images comprising terms or phrases of tags associated with the selected media item.

22. Non-transitory computer-readable media having stored thereon a software program, which when executed, causes one or more computers to perform a method of browsing and displaying media items from a media collection comprising steps of:
  storing information about each of a plurality of media items in a media collection;
  obtaining a plurality of tags, the tags being terms or phrases associated with one or more of the media items in the media collection;
  storing the tags in machine-readable storage media;
  displaying a an item image that is representative of a media item on a display screen along with tag images comprising the terms or phrases of each of a plurality of tags associated with the media item;
  in response to a user selecting a particular one of the displayed tag images, displaying the selected tag image along with a plurality of item images that are representative of media items associated with the selected tag, the item images each having a size that represents a respective relevancy of the media item to the selected tag; and
  in response to the user selecting a particular one of the displayed item images after said selecting a particular one of the displayed tag images, displaying the selected item image along with a plurality of tag images comprising terms or phrases of tags associated with the selected media item.

* * * * *